United States Patent

Vansteelant et al.

[11] Patent Number: 5,347,920
[45] Date of Patent: Sep. 20, 1994

[54] TWINE FORCE SENSING APPARATUS FOR USE ON A RECTANGULAR BALER

[75] Inventors: Marc G. Vansteelant, Zedelgem; Marnix J. Schoonheere, Ichtegem, both of Belgium

[73] Assignee: Ford New Holland, Inc., New Holland, Pa.

[21] Appl. No.: 33,664

[22] Filed: Mar. 16, 1993

[30] Foreign Application Priority Data

Mar. 16, 1992 [EP] European Pat. Off. ......... 92200743.0

[51] Int. Cl.⁵ .................. B65B 57/10; B65B 13/26
[52] U.S. Cl. ........................... 100/4; 56/343; 100/18; 100/23; 100/43; 100/191
[58] Field of Search ............... 100/4, 17–24, 100/43, 179, 191, 192; 56/341, 343

[56] References Cited

U.S. PATENT DOCUMENTS

| | | | |
|---|---|---|---|
| 3,416,824 | 12/1968 | Nolt et al. | 289/2 |
| 3,851,575 | 12/1974 | Cardoza | 100/4 |
| 4,095,520 | 6/1978 | Burford | 100/4 X |
| 4,196,661 | 4/1980 | Yatcilla et al. | 100/4 |
| 4,624,180 | 11/1986 | Strosser | 100/41 |
| 4,765,235 | 8/1988 | Schrag et al. | 100/4 X |
| 4,885,991 | 12/1989 | Borba | 100/4 |
| 4,930,411 | 6/1990 | Naaktgeboren | 100/4 |
| 4,993,317 | 2/1991 | Collot et al. | 100/4 |

FOREIGN PATENT DOCUMENTS

| | | |
|---|---|---|
| 0223351 | 5/1987 | European Pat. Off. . |
| 0286900 | 10/1988 | European Pat. Off. . |
| 3640696 | 6/1988 | Fed. Rep. of Germany ......... 100/4 |
| 208748 | 4/1984 | German Democratic Rep. .... 100/4 |

*Primary Examiner*—Stephen F. Gerrity
*Attorney, Agent, or Firm*—Frank A. Seemar; Larry W. Miller

[57] ABSTRACT

A rectangular baler is disclosed comprising a bale case (6) into which successive charges of crop material are introduced; a plunger (7) disposed for reciprocating movement in the bale case (6) to compact the charges while advancing the compacted charges toward an exit opening in the bale case; and a knotter (8) for tying a flexible binding material, such as twine, in a form-stabilising manner around successive increments of compacted crop material while they advance in the bale case (6) to form bales. An elongated sensor (48), disposed on the knotter (8) in the trajectory of the flexible material (49) projecting from a twine holder (32) towards a billhook (33), is operable to detect the tensile forces occurring in the binding material during bale formation and to produce signals, which are processed by a microprocessor (24) to, if found necessary, lower the density of the bales in order to avoid twine failure.

5 Claims, 3 Drawing Sheets

TWINE FORCE SENSING APPARATUS FOR USE ON A RECTANGULAR BALER

BACKGROUND OF THE INVENTION

The present invention relates to a sensing apparatus for detecting the tensile forces experienced in a strand of flexible binding material while being wrapped and tied around a bale of crop material such as hay or straw, for example.

In a conventional rectangular baler, as exemplified in U.S. Pat. No. 3,416,824, hay, straw or similar crop material that has been previously cut, windrowed or swathed, is picked up from the ground by a pick-up unit and fed in successive batches or charges into an elongated bale chamber in timed sequence with a reciprocating plunger. The plunger compresses the material into bales and, at the same time, gradually advances the bales towards the outlet of the bale chamber. As the bales reach a predetermined length as determined by a metering device, a knotter device is actuated which wraps cord, twine or other flexible binding material around the bale and secures the ends of the binding material together.

In a typical rectangular baler the knotter device, commonly comprising two or more knotters, is mounted on the bale chamber above a slot therein, each knotter comprising a twine holder from which twine extends to encircle a bale. During the baling operation, a leading strand of twine is held by the twine holder and extends forwardly across a knot tying member, known in the art as a billhook, and a twine guiding member and then in front of the bale being formed. The twine guiding member supports the strand so that it does not bear forcefully against the billhook. A needle is involved in completing the encirclement of twine around the bale and, when advancing, the needle lays a trailing strand across the twine guiding member, the billhook and the twine holder. To initiate the formation of a knot by the billhook in the leading and trailing strands of twine, a twine finger captures the strands and positively positions them against a heel of the billhook.

On completion of the operation of the knotter, the twine finger returns to its initial position. The tied knot is mechanically stripped from the billhook by moving the twine guiding member thereacross; the member normally embodying a knife operable to cut the twine from the twine supply so that the tied bale is complete in itself. Finally, evacuation of the completed bale from the bale chamber is effected by starting the formation of a new bale in front of the completed one thereby forcing the latter rearwardly out of the baler.

The present day balers are expected to meet high demands regarding capacity of the baler, as well as density of the bales and reliability of operation. Under certain tough operating conditions, e.g. when baling damp silage crop at a considerable density, the tying process may intermittently fail. Failure occurs either because of breakage of the binding material or because the binding material is pulled from the tying mechanism. Both types of failure usually occur within a few plunger strokes after a tying cycle. It is during this interval that the leading strand of the binding material encounters the greatest resistance to sliding between a completed bale and a new bale being formed as both are pushed toward the exit opening in the bale case. Also, at this stage of the bale formation, only little crop material is present between the plunger and the strand of twine at the leading end of the bale being formed, meaning that the high acceleration forces of the plunger during its compression stroke are not cushioned by the crop material but are almost integrally transmitted to the binding material which thereby is subjected to elevated tensions, sometimes leading, as already mentioned, to the binding material being pulled out from the twine holder or to breakage of the binding material in the vicinity either of the twine holder or the twine guiding member. These areas have been found to be the most critical for twine breakage as the binding material in these regions eventually might be slightly damaged by clasping the twine in the twine holder or by pulling the twine around the twine guiding member, whereby the tensile strength of the twine may be reduced below a level sufficient to resist tensions experienced therein during bale formation.

In current large rectangular balers, bales commonly are wrapped with synthetic twine, made of polypropylene and having a specific length between 130 and 150 m/kg with a corresponding tensile strength between respectively 2900N and 2500N. Using twine with a specific length below 130 m/kg, thus having a larger tensile strength, theoretically could lessen twine failure occurrence. However, such a twine is not currently available in the field of agricultural application and moreover, even if it were, the use thereof could not be recommended as this would require all components of a knotter mechanism to be redesigned and redimensioned completely, which would represent an enormous and expensive job having the complexity of a knotter mechanism in mind.

To at least alleviate the inherent problems of twine failure, the arrangement disclosed in DD-A-208,748 proposes to notify the operator at the initiation of a tying cycle if a twine failure has occurred so that operation of the baler may be stopped before the bale is ejected. During normal operation, a sensor arm, disposed in the path of travel of the binding material and hence engaged thereby, is resiliently held in a position away from an electrical switch. When the binding material breaks, the sensor arm is released and the electrical switch is actuated whereby the operator is alerted to the twine failure. Although corrective action then can be taken while the broken bale is still in the bale chamber, it nevertheless will be appreciated that the foregoing inevitably leads to down time of the machine which is unacceptable.

SUMMARY OF THE INVENTION

It therefore is the objective of the present invention to overcome the aforedescribed disadvantages inherent to twine failure by detecting when a twine failure is likely to occur and to prevent it from happening.

According to the present invention, a rectangular baler is provided comprising, a bale case into which successive charges of crop material are introduced and having at least one wall portion which is movable generally laterally thereof to vary the cross-sectional area of the bale case, a plunger disposed for reciprocating movement in the bale case to thereby compact the charges while advancing the compacted charges toward an exit opening therein, a knotter for tying a flexible binding material, such as twine, in a form-stabilising manner around successive increments of compacted crop material while they advance in the bale case to form bales of which the density at least partially is determined by the dimensions of the variable cross-sectional area, and a sensor for detecting the tensile forces occurring in the binding material during bale formation and producing signals representative thereof.

More specifically, the sensor preferably comprises a rod-shaped elongated body, which is disposed in the trajectory of a leading strand of twine projecting from a twine holder towards a billhook, whereby the tensile forces in the strand are partially transmitted to the sensor. Strain gauges, attached to the sensor body, detect deflections of the sensor which correspond to the load imposed thereon and produce signals proportional thereto, the signals being processed by a micro-processor for taking the necessary steps to reduce the tension on the twine if found imperative.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
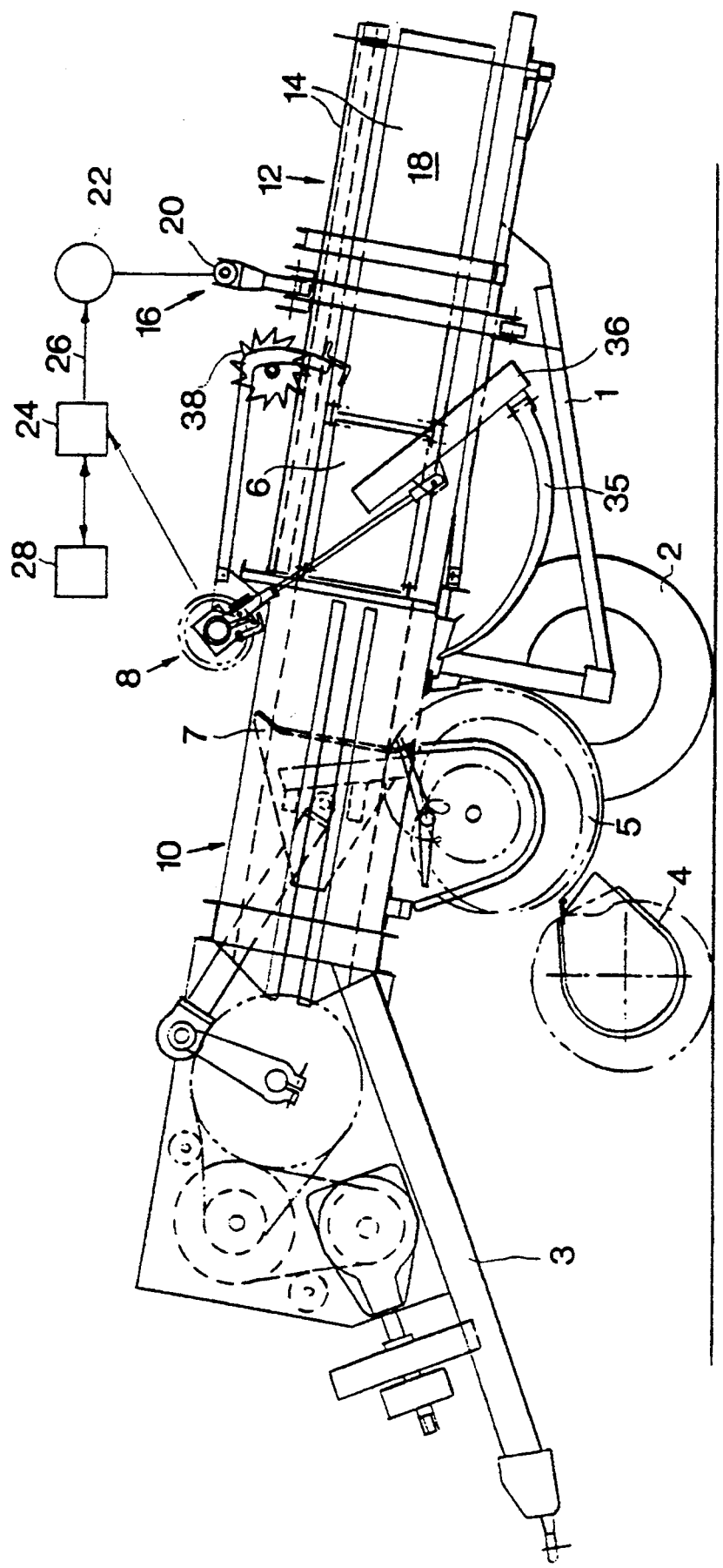
FIG. 1 is a diagrammatic side elevational view of a rectangular baler comprising a knotter station on top of the bale chamber.

Referring first to FIG. 1, the baler is basically conventional in that it comprises a main frame 1 fitted with a pair of ground-engaging wheels 2 and a tow bar 3, arranged to be attached to a tractor (not shown). A pick-up mechanism 4 picks up crop material from the ground and delivers it to a feed chamber 5 from where it is transferred to a bale case or chamber 6 in which a bale of crop material is formed. A plunger 7 is reciprocable within the bale chamber 6 to act upon wads of crop material transferred from the feed chamber 5 into the bale chamber 6 and to compress these wads into a bale which, during formation, is moved progressively along the bale chamber 6 from left to right as seen in FIG. 1. A completed bale is tied with twine or the like at a knotter station 8 and rearwardly discharged from the machine.

The bale chamber 6 comprises a forward portion 10 with fixed dimensions and a rearward portion 12 of which the dimensions can be varied by means of movable top and side rails 14. A tension adjusting mechanism 16 is provided for moving the rails 14 to thereby vary the cross-sectional area of region 18 of the bale chamber 6 and as such controlling the density of the bales produced. The tension adjusting mechanism 16 includes a hydraulic cylinder unit 20 for moving the movable rails 14 and a current controlled pressure valve 22 for controlling the hydraulic cylinder unit 20. A micro-processor based control circuit 24 controls the operation of the baler and provides a pulse width modulated signal over lead 26 to control valve 22. An operator's control and indicator panel 28 is provided so that an operator may observe indications of operating conditions in various parts of the baler and may manually key in control data such as related to bale density for example. The construction of the bale chamber 6 and the operation of the control circuit 24 as schematically shown in FIG. 1 are respectively described in more details in EP-B-0.152.970 and EP-B-0.223.351, to which reference is made.

Figure 2:
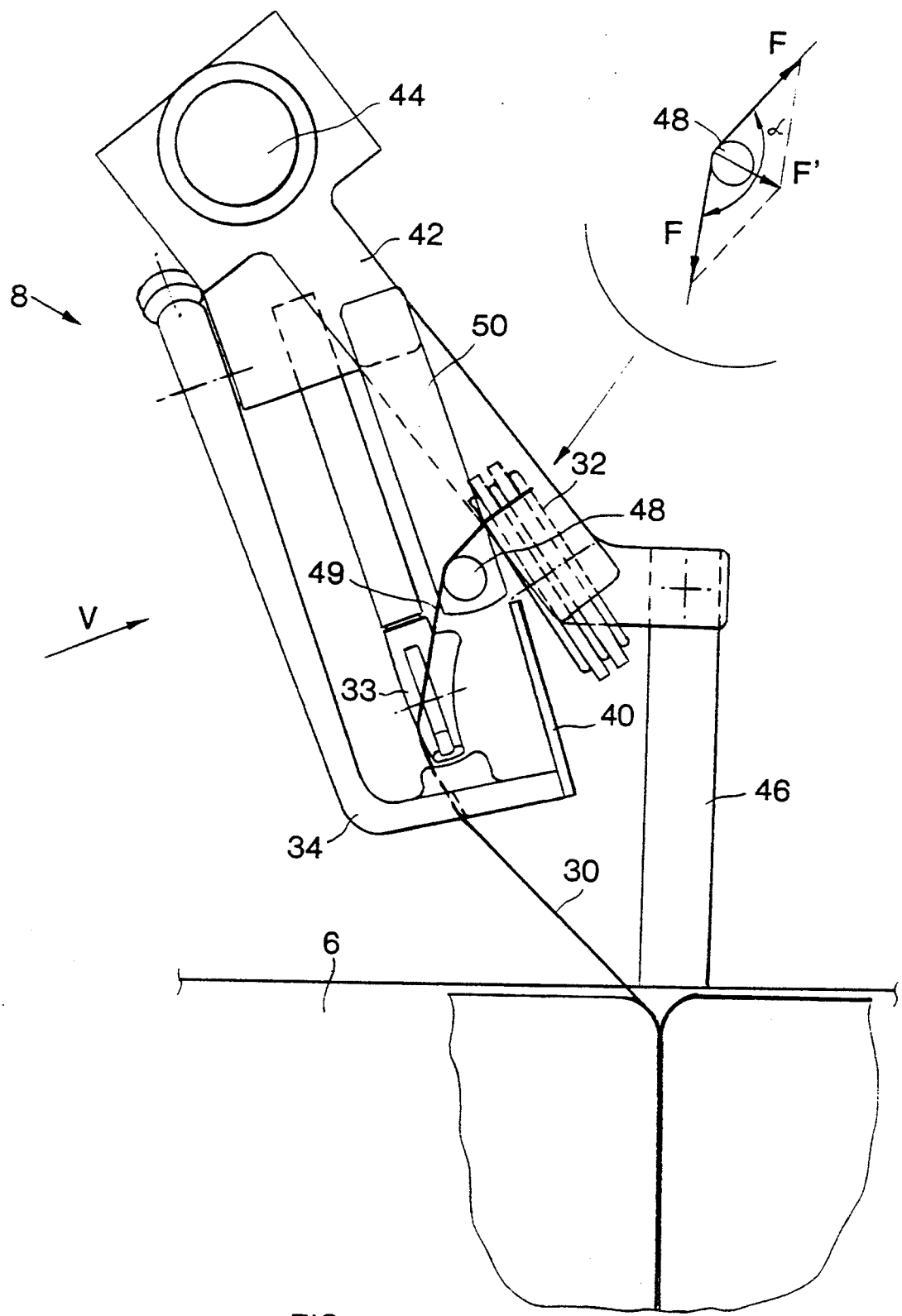
FIG. 2 is an enlarged side view of the knotter station incorporating a sensor means.

Referring more specifically to FIGS. 1 and 2, the knotter station 8 comprises a plurality of knotters which are transversely spaced on top of the bale chamber 6 and which all operate in the following identical manner. Arranging a strand of twine around a bale usually starts with clamping a leading end of the strand 30 in a twine holder 32 from where it projects downwardly over a billhook 33 and a twine guiding member 34 through the bale chamber 6. As the crop material is compressed and progressively moved towards the exit of the bale case 6, the twine is taken along so that it extends along the top of the bale, down the leading end thereof and beneath the lower surface of the bale. From there, the twine extends through an eye in the forward end of a curved needle 35 comprised in a pivotable needle assembly 36. A star wheel 38 is operatively coupled to the knotter station 8 and monitors the bale length as a bale progressively is formed. When a bale has been formed to a desired extent, the tying operation is initiated by arcuately moving the needle assembly 36 to project the forward ends of the needles 35 upwardly through the bale case 6 and into the region of the billhook 33 and the twine holder 32 in order to carry a trailing strand of twine into association with the leading strand of twine already clamped in the twine holder 32, whereafter both strands are knotted together by the billhook 33. To free the knotted loop from the knotter 8, both strands are cut from the twine holder 32 by moving the twine guiding member 34, which supports a knife 40, across the billhook 33 meanwhile stripping the knot therefrom.

It will be appreciated by a person skilled in the art that the cyclic movement of the needle assembly 36 not only ensures the delivery of a trailing strand of twine to the twine holder 32 for tying a completed bale but moreover at the same time initiates the formation of a new bale by providing the twine holder 32 with a new leading strand of twine.

As best seen in FIG. 2, all knotter components, such as the twine holder 32, the billhook 33 and the twine guiding member 34, are incorporated in a knotter frame 42, which in turn is supported on the one hand by a knotter shaft 44 and on the other hand by a support arm 46, rigidly connected to the baler frame 1. The knotter shaft 44 furthermore is operative to drive all movable components of each knotter 8.

In the preferred embodiment of the present invention, a rod shaped sensor 48 is provided intermediate the twine holder 32 and the billhook 33 in a manner such that the normally straight course of the leading twine portion 49 therebetween becomes slightly upwardly angled as a result of said portion 49 now supplementary being supported intermediate its course by the sensor 48. As a knotter is inherently a relatively complicated and compact arrangement, several functional limitations are to be taken into account for positioning the sensor 48 properly in the confined space as proposed hereabove in order to avoid interference of operation between the sensor 48 and the twine holder 32, the billhook 33, the twine guiding member 34 and the needle 35.

Figure 3:
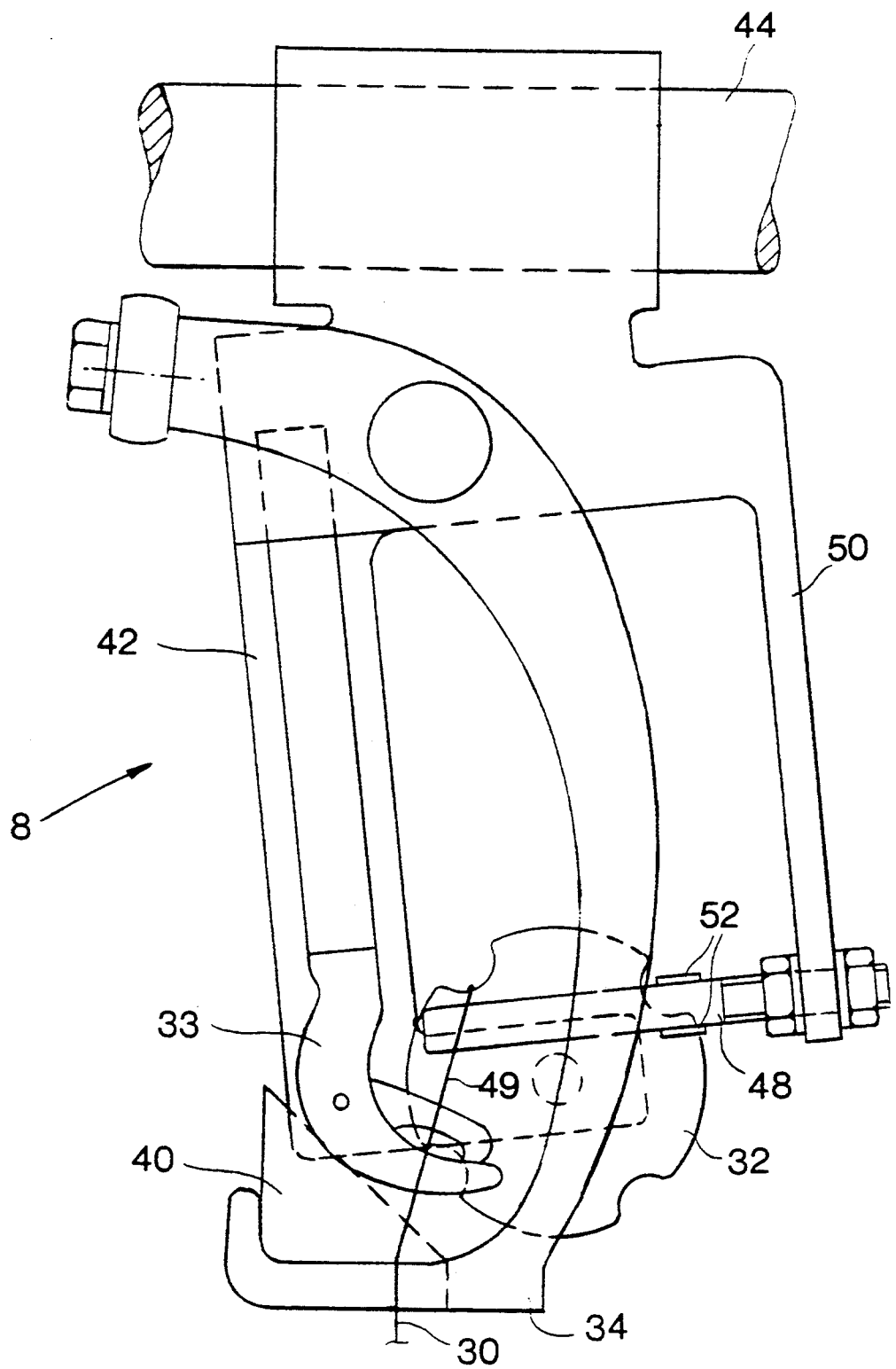
FIG. 3 is a curtailed view of one knotter with certain parts removed, taken along arrow V in FIG. 2.

With particular reference to FIGS. 2 and 3, the sensor 48 is disposed generally horizontally and perpendicularly to the course of the leading portion of twine 49, with the distal end of the sensor 48 supporting portion 49. The sensor 48 is provided with a threaded end for releasable connection to a rigid arm 50 which forms a unitary structure with the knotter frame 42. Any deflection of the sensor 48 caused by a load imposed on the distal end thereof as a result of twine tension, is registered by strain gauges 52, which are suitably disposed onto the sensor 48 intermediate its ends and are operatively connected to the microprocessor 24.

It will be clear that during the complete formation of a bale, exception made of the actual tying cycle, the relative position of the twine holder 32, the sensor 48 and the billhook 33 with respect to each other remain unchanged. In other words, whether a new bale only just has been started, whereby the leading strand of twine 30 extends nearly vertically, or whether bale formation is reaching completion, whereby said strand 30 lies nearly horizontally, the enclosed angle α of the twine portion 49 effected by the sensor 48 remains the same throughout the process of forming a bale. The foregoing thus implies that tensile forces of a given value F in the twine portion 49 always result in a corresponding compound force of a given value F' acting on the sensor 48 in a predetermined direction, being the bisector of the enclosed angle α, irrespective of the stage of the bale formation.

Notwithstanding the foregoing, it nevertheless should be mentioned that the leading strand of twine 30 is also partially wrapped around the twine guiding member 34, to a degree dependent on the stage of the bale formation. Consequently, the more a bale under formation grows, the larger the angle of enclosure of the leading strand 30 around the twine guiding member 34 becomes, whereby a fraction of the tensile forces experienced in the twine 30 is transformed in frictional forces. However, this fraction is virtually neglectable, the more that the influence thereof is minimal during the first stage of the formation of a new bale; a stage which is considered to be the most critical for being confronted with twine failure.

The value of the force F' on the sensor 48 is sensed by the strain gauges 52 and translated in an electrical signal. In an ideal situation, there is a linear relationship between the electrical output of the strain gauges 52 and the forces F' imposed on the sensor 48. In practice however, there might be a slight deviation from the linear behaviour as a result of the non-linear characteristics of the strain gauges 52 on the one hand and the characteristics of the binding material on the other hand. However, deviation electronically may be compensated.

Turning now to the actual operation of the sensor 48 during the formation of a bale, it will be appreciated from the foregoing that the value of the electrical signals produced by the strain gauges 52 are proportional to the tensile forces experienced in the twine portion 49, generated therein as a result of resistance to sliding of the twine 30 between a completed bale and a new bale to be formed. These signals are compared in the microprocessor 24 with a preset threshold value, which is predetermined in accordance with the characteristics of the binding material used. As long as the twines are subjected to loads which stay below the predetermined acceptable level, bale density may be controlled by the electronic bale density controller 24 such as disclosed in EP-B-0.223,351. However, if for one or other reason the binding material becomes too heavily tensioned, thereby exceeding the preset value, priority is given to the output of the twine force sensor 48, in accordance to which the micro-processor 24 instructs the cylinder unit 20, through the pressure valve 22, to immediately decrease the tension on the top and side rails 14 of the bale chamber 6 in order to correspondingly decrease the tensile forces in the bale binding material so that twine failure is avoided. Twine overload most frequently may occur during the first plunger strokes in the formation of a new bale, as already mentioned, meaning that the twine force sensor 48 usually only has to interfere with the normal operation of the baler, more specifically in respect to the bale density setting, during this reduced stage of bale formation. In case the density settings of the baler would be so demanding that a continuous or at least too frequent interference of the twine force sensor 48 would be required, then either the operator has to be warned through his indicator panel 28 of the intolerable situation enabling him to manually change predetermined density settings or the normally operating bale density controller 24 automatically may interfere to lower the density demands.

When bale formation approaches completion, twine forces usually are low. However, during the actual tying cycle, the leading and trailing strands of twine are forcefully stripped from the sensor 48 due to the rotation of the billhook 33, imposing a considerable peak-load on the sensor 48, whereby a one-time signal is created which is representative for and can be recognised as the completion of one bale and the initiating step in the formation of a subsequent one. It will be evident to a person skilled in the art that, although the one-time peak-load may exceed the preset value, the density setting of the bale chamber 6 should not be modified as a result thereof. Again, care thereof can be taken by the micro-processor 24.

To facilitate the removal of the leading and trailing strands of twine from the sensor 48 during the tying cycle, the sensor 48 may be conically shaped or have a distal end which is slightly bent downwardly for better cooperation with the billhook 33.

As an alternative, the cantilevered type sensor 48 may be replaced by a resiliently supported hingeable finger, movement of which can be measured by a displacement transducer such as a linearly variable differential transformer (LVDT), which is well known in the art. Displacement of the hingeable finger is proportional to the load imposed thereon and therefore is representative of the forces experienced in the twine.

Instead of employing the sensor 48 with the strain gauges 52, it also can be proposed in another arrangement to provide the twine guiding member 34 with strain gauges in order to detect deformations of member 34 as a result of twine forces.

Considering further that the twine forces are transmitted to the twine holder 32 and hence to the knotter frame 42, the latter as a result aims to rotate around the shaft 44 but is prevented from doing so by the support arm 46. In still another arrangement, a dynamometer may be provided to measure the forces created in the support arm 46 which are also representative of the twine forces. Eventually, deflections of the twine holder 32 also can be used as a basis for determining twine forces.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a rectangular baler comprising a bale case (6) into which successive charges of crop material are introduced and having at least one wall portion (14) which is generally laterally thereof to vary the cross-section sectional area (18) of said bale case (6), plunger means (7) disposed for reciprocating movement in said bale case (6) to thereby compact said charges and advance such compacted charges toward an exit opening therein, knotter means (8) for tying twine in a form-stabilizing manner around successive increments of compacted crop material while they advance in said bale case (6) to form bales of which the density at least partially is determined by the dimensions of said variable cross-sectional area (18), sensor means (48) for detecting the tensile forces occurring in said twine during bale formation and producing signals representative of said tensile forces, control means coupled to said sensor means, positioning means operatively associated with said wall portion, said signals produced by said sensor means (48) are transmitted to said control means (24), which control means is operable to control said positioning means (16, 20) to move said at least one wall portion (14) to thereby vary said cross-sectional area (18) of said bale case (6) in a manner to control the density of the crop material compacted by said plunger means (7), the improvement wherein said control means (24) comprises a micro-processor (24) in which the values of the sensor signals are compared with a predetermined threshold value entered into said micro-processor (24) through an operator panel (28); said micro-processor (24) being programmed in a manner such that, when the force values exceed said predetermined threshold value, said positioning means (16, 20) move said at least one wall portion (14) in a direction to enlarge said cross-sectional area (18) of said bale case (6) for correspondingly decreasing the bale density and thereby reducing said tensile forces experienced in said twine.

2. A baler according to claim 1 wherein said predetermined threshold value is proportional to the strength characteristics of said twine used during the baling operation.

3. In a rectangular baler comprising a bale case (6) into which successive charges of crop material are introduced and having at least one wall portion (14) which is movable generally laterally thereof to vary the cross-sectional area (18) of said bale case (6), plunger means (7) disposed for reciprocating movement in said bale case (6) to thereby compact said charges and advance such compacted charges toward an exit opening therein, knotter means (8) for tying twine in a form-stabilizing manner around successive increments of compacted crop material while they advance in said bale case (6) to form bales of which the density at least partially is determined by the dimensions of said variable cross-sectional area (18), sensor means (48) for detecting the tensile forces occurring in said twine during bale formation and producing signals representative of said tensile forces, the improvement wherein said knotter means (8) comprises at least one knotter (8) having a twine holder (32) operable to hold, during the baling operation, a leading strand of twine (30, 49);

a rotary billhook (33), which is disposed in a fixed position relative to said twine holder (32) during a substantial portion of a bale forming cycle during which a portion (49) of said leading strand of twine (30, 49) extends from said twine holder (32) towards and over said billhook (33); and said sensor means (48) is mounted between said twine holder (32) and said billhook (33) in a manner such that said portion of twine (49) is supported thereby along its course from said twine holder (32) towards said billhook (33).

4. A baler according to claim 3 wherein said sensor means (48) comprises an elongated rod-shaped body (48), one end of which is releasably attached in a cantilevered fashion to a rigid extension (50) of said knotter (8) and the other end of which supports said portion of twine (49).

5. A baler according to claim 4 further comprising strain gauges (52) operatively connected to said sensor body (48); the arrangement being such that the tensile forces experienced in said twine portion (49) are, at least partially, transmitted to said sensor body (48) which, as a result, is deflected proportional therewith; said deflection being sensed by said strain gauges (52) which produce signals representative thereof.

* * * * *